(12) United States Patent
Hilde

(10) Patent No.: US 9,215,382 B1
(45) Date of Patent: Dec. 15, 2015

(54) APPARATUS AND METHOD FOR DATA FUSION AND VISUALIZATION OF VIDEO AND LADAR DATA

(71) Applicant: THE UNITED STATES OF AMERICA AS REPRESENTED BY THE SECRETARY OF THE NAVY, Washington, DC (US)

(72) Inventor: Jeffrey J. Hilde, Onyx, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 108 days.

(21) Appl. No.: 14/172,146

(22) Filed: Feb. 4, 2014

Related U.S. Application Data

(60) Provisional application No. 61/858,193, filed on Jul. 25, 2013.

(51) Int. Cl.
*H04N 5/265* (2006.01)
*G01S 7/51* (2006.01)
*G06T 3/40* (2006.01)
*G06T 19/20* (2011.01)

(52) U.S. Cl.
CPC *H04N 5/265* (2013.01); *G01S 7/51* (2013.01); *G06T 3/4061* (2013.01); *G06T 2207/20221* (2013.01)

(58) Field of Classification Search
CPC ............... G01S 7/51; H04N 5/2625; G06T 2207/20221; G06T 3/4061
See application file for complete search history.

(56) References Cited

U.S. PATENT DOCUMENTS

| 5,495,576 A * | 2/1996 | Ritchey .................. 345/420 |
| 2007/0031064 A1* | 2/2007 | Zhao ............... G06K 9/00214 382/285 |
| 2010/0271615 A1* | 10/2010 | Sebastian et al. ........... 356/4.01 |
| 2012/0081544 A1* | 4/2012 | Wee .......................... 348/140 |
| 2012/0243774 A1* | 9/2012 | Chen et al. ................. 382/154 |

* cited by examiner

*Primary Examiner* — Jeffery A Brier
(74) *Attorney, Agent, or Firm* — James M. Saunders

(57) ABSTRACT

Data fusion and visualization of video and LADAR data includes using a fusion matrix to electronically transform each point of a LADAR point cloud from Cartesian coordinates into a homogeneous fusion coordinate system (FCS). The FCS has projective geometry dimensions of row, column, and depth. A control camera is provided for user input to generate a control matrix. A fusion point cloud is generated by electronically fusing each transformed point. The pixel color is found in the video frame at the row and column indicated from the transform of each point of the LADAR point cloud. The control camera is used to control a view of the fusion point cloud by removing non-visible points found at depths deeper than a point having the smallest depth for each row and column. The visible points are rendered on the fusion point cloud to generate a control frame.

5 Claims, 6 Drawing Sheets

APPARATUS AND METHOD FOR DATA FUSION AND VISUALIZATION OF VIDEO AND LADAR DATA

CROSS-REFERENCE TO RELATED APPLICATIONS

This is a non-provisional application, claiming the benefit of parent provisional application No. 61/858,193 filed on Jul. 25, 2013, whereby the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to data fusion and, more particularly, to the fusing, the co-locating in time and space, of a three-dimensional data stream with a two-dimensional data stream.

Figure 1:
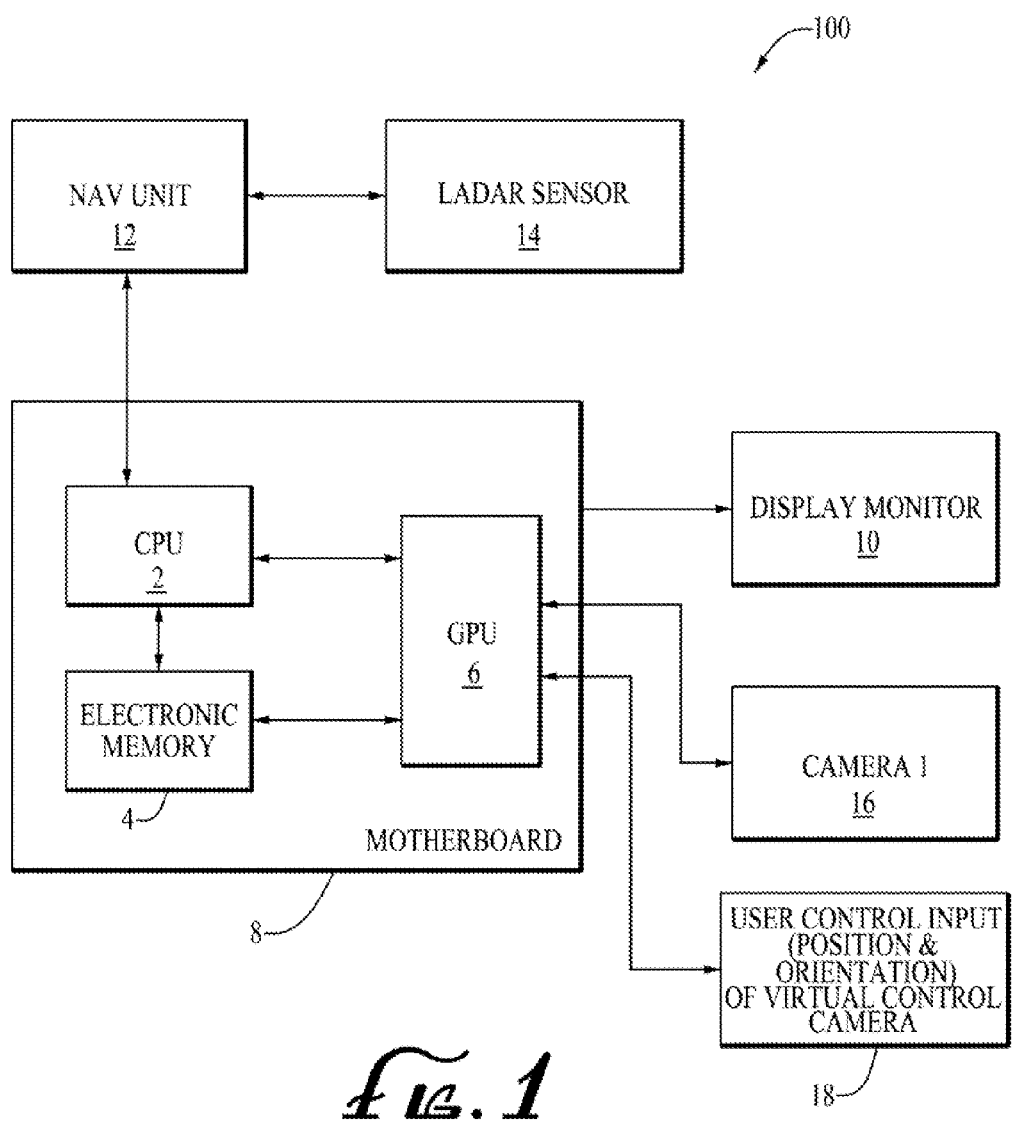
FIG. 1 illustrates components of some systems and/or articles of manufacture, according to some embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments of the invention generally relate to data fusion, the composition of three-dimensional data and two-dimensional data for processing and visualization. More particularly, this technology relates to the fusion, the co-locating in time and space, of a three-dimensional data stream with a two dimensional data stream.

Embodiments of the invention are described as an apparatus and method that provides for the fusion of data, where: (1) the three-dimensional data is provided by a LADAR sensor; (2) the two-dimensional data is provided by a video camera (a physical sensor); (3) the relative position and orientation of the sensors is known or discovered; and (4) both the LADAR sensor and video camera collect data on the same surfaces. However, even though described using a LADAR sensor and video camera, this technology includes the substitution of any sensor capable of three-dimensional data collection for the LADAR sensor and any sensor capable of two-dimensional data collection for the video camera.

Embodiments provide a unique solution for the fusion of video and LADAR data (VILAFU). Included is an apparatus and method of synthesizing a time sequence of image frames as would be collected from an imaginary video camera arbitrarily positioned in time and space as directed by purposes including, but not limited to, enhancing the recognition of objects in the sensor data for either human operators (visualization) or automatic recognition methods (processing) or other valuable purposes. The LADAR sensor and the video camera relative position and orientation are known or determined separate from this technology.

First, using a video frame and using the LADAR points collected previous in time to this frame and next in time to the beginning of the prior LADAR frame, and using the video frame field of view, pixel width and height, and relative position and orientation, a computation is performed. A row and column projection are computed for each point and fuse or mark that point with the color in the video frame found at that row and column.

Next, using an imaginary video camera field of view, pixel width and height, and relative position and orientation, render all the colored points (or from these points derive new points to be rendered, such as can be done by forming surfaces from the points and taking new points from the formed surface) into a depth-buffer frame to determine the points visible for composition of the fused frame for presentation or for processing purposes. This process is repeated by continuing with the next video frame.

Although embodiments of the invention described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

At the outset, it is helpful to describe various conventions, parameters, and terminology associated with embodiments of the invention.

Intensity

The term "intensity" is used in conjunction with energy intensity. A person having ordinary skill in the art will recognize that several examples of "intensity" are often referred to as "energy intensity" and include, but are not limited to, x-ray, infrared, ultraviolet, and color spectrums, which are all particular bands of energy.

Video Camera

The Video Camera is an actual physical sensor that produces a Video Frame of Pixels. "V" is used to designate the video camera parameters and information.

A data type V holds the parameters and information related to the video camera. A frame to frame time period, $V_p$, is a data field of the data type V. $V_p$ is the time period from one frame of the video camera to the next frame.

A two dimensional array, ($V_i[r,c]$), holds an intensity value for each element of the array. The two dimensions correspond to the rows and columns of the video camera. A time, ($V_t$), corresponding to the time that the intensity value, ($V_i[r,c]$), was collected.

$V_d[r,c]$ is a two dimensional array and is a depth buffer for the video camera. The depth buffer holds a depth for each element of the array. The two dimensions are correspond to the rows and columns of the video camera.

A two-dimensional array, (V.P [r,c]), represents the video camera points of an instance of the data type, P, for each element of the array. The two dimensions correspond to the rows and columns of the video camera.

Video Frame

The Video Frame is an intensity image frame (I) of Pixels in rows and columns produced by the Video Camera with some frame rate.

Pixel

A Pixel is one row (r) and column (c) element of the Video Frame with color intensity ($I_{r,c}$).

LADAR Sensor

The LADAR Sensor is an actual physical sensor that produces a LADAR Point Cloud. A LADAR Sensor flash (F) is a data type F holding information related to the LADAR sensor flash. This includes all of the points (P) collected at time $F_t$. Time $F_t$ is the time that the points for a flash were collected by the LADAR sensor.

LADAR Point Cloud

The LADAR Point Cloud is a collection of three-dimensional points produced by the LADAR Sensor, where these points are on a scene surface that the Video Camera is imaging.

Point

A Point is one element of a Point Cloud having three-dimensional $$\begin{bmatrix} L_x \\ L_y \\ L_z \end{bmatrix}$$

Cartesian coordinates and after transformation by the Fusion Matrix has additional dimensions row, column, and depth (r, c, d) and is fused or marked with color intensity ($I_{r,c}$). The point may also be shown by $$\begin{bmatrix} P_x \\ P_y \\ P_z \end{bmatrix}.$$

The depth dimension is the basis for determining the visibility of the Point and if non-visible (to the Video Camera) it is removed from the Point Cloud as is typically done with a depth-buffer. Again, similarly, the Point undergoes the Control Matrix transform and is removed if non-visible (to the Control Camera). Finally, if the Point is not removed it becomes a pixel in the output Control Frame.

Each point may be designated as P or (P), which is a data type P holding information related to a point collected with the LADAR sensor. Nomenclature can vary such as, for example, L or (L) is sometimes used instead of P for points. The information is referenced in various data types described below.

A data field, $P_x$, of the data type P, refers to the x coordinate value in an earth fixed coordinate frame.

A data field, $P_y$, of the data P, is the y coordinate value in an earth fixed coordinate frame.

A data field $P_z$, of the data type P, refers to the z coordinate value in an earth fixed coordinate frame.

A data field $P_I$, of the data type P, is the intensity of color that the video camera sees for the data type P.

Sensor Geometry

The Sensor Geometry is the information needed to know, construct, determine and/or compute a Fusion Matrix.

Transforms

Some embodiments of the invention use perspective transformation matrices for transforming the point P into a row, column, and depth of a perspective view of an image. M is used to designate a fusion matrix in some embodiments. N is used to designate a control matrix in some embodiments. The fusion and control matrices may also be designated with the letters F and C, respectively.

Fusion Matrix

The Fusion Matrix is the perspective projection transformation $$\begin{bmatrix} F_{11} & F_{12} & F_{13} & F_{14} \\ F_{21} & F_{22} & F_{23} & F_{24} \\ F_{31} & F_{32} & F_{33} & F_{34} \\ F_{41} & F_{42} & F_{43} & F_{44} \end{bmatrix}$$

needed to transform each Point of the LADAR Point Cloud into the Fusion Coordinate System. Similarly, depending on the nomenclature used $$\begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix}$$

is also valid.

Fusion Coordinate System

The Fusion Coordinate System is a three-dimensional row, column, and depth (r, c, d) homogeneous or projective coordinate system with one axis parallel to the rows of the Video Frame, one parallel to the columns, and the other one is the depth from the Video Camera to the scene that appears in each Pixel, where dimensions along the r-axis is measured in pixel rows and along the c-axis in pixel columns.

Fusion

The Fusion is a process that uses the Fusion Matrix to transform each Point of the LADAR Point Cloud into the Fusion Coordinate System and the color intensity ($I_{r,c}$) so indicated by the row (r) and column (c) of the transformed Point $$\begin{bmatrix} r \\ c \\ d \\ 1 \end{bmatrix}$$

is now fused to that Point. The transformed Point is computed as follows:

$$w \cdot \begin{bmatrix} r \\ c \\ d \\ 1 \end{bmatrix} = \begin{bmatrix} w \cdot r \\ w \cdot c \\ w \cdot d \\ w \end{bmatrix} = \begin{bmatrix} F_{11} & F_{12} & F_{13} & F_{14} \\ F_{21} & F_{22} & F_{23} & F_{24} \\ F_{31} & F_{32} & F_{33} & F_{34} \\ F_{41} & F_{42} & F_{43} & F_{44} \end{bmatrix} \begin{bmatrix} L_x \\ L_y \\ L_z \\ 1 \end{bmatrix}$$

Fusion Point Cloud

The Fusion Point Cloud is the LADAR Point Cloud after having each Point of the collection fused with a Pixel color intensity and after having the non-visible (to the Video Camera) Points removed. Alternatively, new Points can be derived from the original Points such as can be done when forming a surface from the original Points and re-sampling that surface to create new and/or replacement Points as members of the Point Cloud collection.

Control

The Control is control by a viewing human operator or some process that manipulates the Control Camera parameters to achieve the desired point of view to render the Control Frame for presentation to display or process.

Control Camera

The Control Camera parameters are the position, orientation, field of view, pixel width, and height of an imaginary video camera from which the Control Matrix is computed and ultimately from which video frames are synthesized using the Fusion Point Cloud as the viewing subject scene.

The letter C or (C) is refers to the control camera and its respective parameters. A data type (C) holds information relating to the control camera.

The control camera depth buffer, $C_d[r,c]$, is a two dimensional array holding a depth for each element of the array. The dimensions correspond to the rows and columns of the control camera.

A two dimensional array, ($C_i[r,c]$), holds an intensity value for each element of the array. The two dimensions of the array correspond to the rows and columns of the control camera. A time, ($C_t$), corresponds to the time that the intensity value, ($C_i[r,c]$), was generated.

Control Matrix

The Control Matrix is a perspective projection transformation matrix $$\begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix}$$

needed to transform each Point of the Fusion Point Cloud into the Control Coordinate System. Similarly, depending on the nomenclature used, $$\begin{bmatrix} N_{11} & N_{12} & N_{13} & N_{14} \\ N_{21} & N_{22} & N_{23} & N_{24} \\ N_{31} & N_{32} & N_{33} & N_{34} \\ N_{41} & N_{42} & N_{43} & N_{44} \end{bmatrix}$$

is also valid.

Control Coordinate System

The Control Coordinate System is a three-dimensional row, column, and depth (r, c, d) homogeneous or projective coordinate system with one axis parallel to the rows of the Control Frame, one parallel to the columns, and the other one is the depth from the Control Camera to the Fusion Point Cloud Points, where dimensions along the r-axis is measured in pixel rows and along the c-axis in pixel columns.

Rendering

The Rendering is a process that uses the Control Matrix to transform each Point of the Fusion Point Cloud into the Control Coordinate System and organizes the transformed Point $$\begin{bmatrix} r \\ c \\ d \\ 1 \end{bmatrix}$$

into a depth-buffer by row (r) and column (c). The transformed Point is computed as follows:

$$w \cdot \begin{bmatrix} r \\ c \\ d \\ 1 \end{bmatrix} = \begin{bmatrix} w \cdot r \\ w \cdot c \\ w \cdot d \\ w \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix} \begin{bmatrix} L_x \\ L_y \\ L_z \\ 1 \end{bmatrix}.$$

The depth-buffer achieves the removal of the non-visible (to the Control Camera) Points and a Control Frame is produced.

Rendering can be performed using the depth-buffer, which is computationally efficient. Alternatively, the rendering can be carried out by software. The field has an extensive literature and range rendering using conventional techniques is known to a person having ordinary skill in the art.

The concept of rendering may be generalized to computing, from a 3D scene model, what would be obtained when an image were recorded and subsequently processed in some way. One example of this is "feature-based rendering." Each object has features which are computed and stored with the object. Feature based rendering computes how those features would appear in the 3D scene model to an observer. Occlusion is used to determine which features are visible, but the appearance of features is computed by projection or some other technique. Hence it is convenient to use "rendering" or "simulated rendering" to describe the process of computing the information that is expected to appear in the image of a 3D scene model from an observer at whatever level is appropriate. Particular examples of "rendering" are range rendering, photo-realistic rendering, and feature-based rendering.

Control Frame

The Control Frame is produced using the Control Matrix, the Fusion Point Cloud, and depth-buffer rendering such as is available on hardware accelerated OpenGL implementations and other computer graphics implementations.

Apparatus/System Embodiments

With reference to FIG. 1, apparatus/system embodiments are collectively shown as reference character 100 and include a Central Processing Unit (CPU) 2 operatively associated with electronic memory 4 and a graphics processing unit (GPU) 6, operatively associated with a display monitor 10, to display a visual depiction of the fusion of video and LADAR data. The central processing unit 2 is the hardware within a computer that carries out the instructions of a computer program by performing the basic arithmetical, logical, and input/output operations of the system. The CPU 2 is operatively associated with memory 4, which includes data and stored instructions. The CPU 2 and memory 4 are both operatively associated with the GPU 6. The GPU 6, also known as a visual processing unit (VPU), is a specialized electronic circuit constructed to rapidly manipulate and alter memory to accelerate the building of images in a frame buffer intended for output to a display. The memory 4 receives input, and stores software, which the CPU 2 and GPU 6 use to perform the processes described herein.

Reference character 8 designates a motherboard, to which the CPU 2, memory 4, and GPU 6 are electrically associated. Reference character 10 is the visual display monitor (screen)

to display a visual depiction of the fusion of video and LADAR data. In some applications, depending on the verification requirements, a visual verification by a user is important to provide an additional layer of validation before acting on the processing result (for example dedicating resources to attack based on the processing result). Some embodiments, therefore, include the display monitor 10, which is sometimes referred to as a visual display screen.

Reference character 12 is a navigation unit such as, for example, one associated with an airborne vehicle. The navigation unit 12 is associated with a LADAR sensor 14, configured to receive signals. The navigation unit 12 is configured to communicate with the CPU 2. Reference character 16 is a video camera (labeled as "camera 1" in FIG. 1) and is associated with and is configured to communicate with the GPU 6. However, there are multiple ways to relate all components. Such as, in one example, the video camera 16 could also be configured to communicate with the CPU 2. The video camera 18 is configured to collect two dimensional video frames composed of color intensity for each pixel as reflected from a surface of a scene.

Reference character 18 is a control camera used to obtain the desired points of view during rendering. The control camera 18 is controlled by user input. The control camera 18 could simply be referred to as "camera 2." In some embodiments, the control camera 18 is referred to as a virtual control camera which means a camera having a mathematical position and orientation. A person having ordinary skill in the art will recognize that a virtual control camera can be something as simple as a standard digital camera. Additionally, it should also be recognized that both the video camera 16 ("camera 1") and "camera 2" 18 can also be actual physical sensors (actual cameras as opposed to virtual cameras).

Article of Manufacture Embodiments

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium 6 can be any non-transitory processor readable medium (media), including, for example, a magnetic storage media, "floppy disk", CD-ROM, RAM, a PROM, an EPROM, a FLASH-EPROM, any other memory chip or cartridge, a file server providing access to the programs via a network transmission line, and a holographic unit. Of course, those skilled in the art will recognize that many modifications may be made to this configuration without departing from the scope.

In some apparatus/system embodiments, the electronic processor is co-located with the processor readable medium. In other system embodiments, the electronic processor is remotely located from the processor readable medium. It is noted that the steps/acts/tasks/processes described herein including the figures can be interpreted as representing data structures or sets of instructions for causing the computer readable medium to perform the step/act/process. Identifying or 'electronically identifying' involves any one or more of the following: 1) associating an electronic marker, tag, or value with the target model that identifies it as a match; 2) storing data associated with the target model or the parameters of the best match hypothesis in memory at a location indicative that the hypothesis/model matches the target; 3) displaying the simulated range image on an visual display; or 4) any conventional means of identifying a target model as a match.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified in the flow chart and/or block diagram block or blocks.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In the accompanying drawings, like reference numbers indicate like elements. FIG. 1 illustrates the components of some systems and/or articles of manufacture, according to embodiments of the invention. Reference character 100 depicts an apparatus of embodiments of the invention. The individual components depicted in FIG. 1 function together to perform the disclosed methods.

FIGS. 2 through 6 are block process diagrams, according to some embodiments of the invention. In particular, the figures relate to data fusion and visualization of video and LADAR data using a non-transitory computer readable medium. FIGS. 2 through 6 are equally applicable to method and article of manufacture embodiments.

Figure 2:
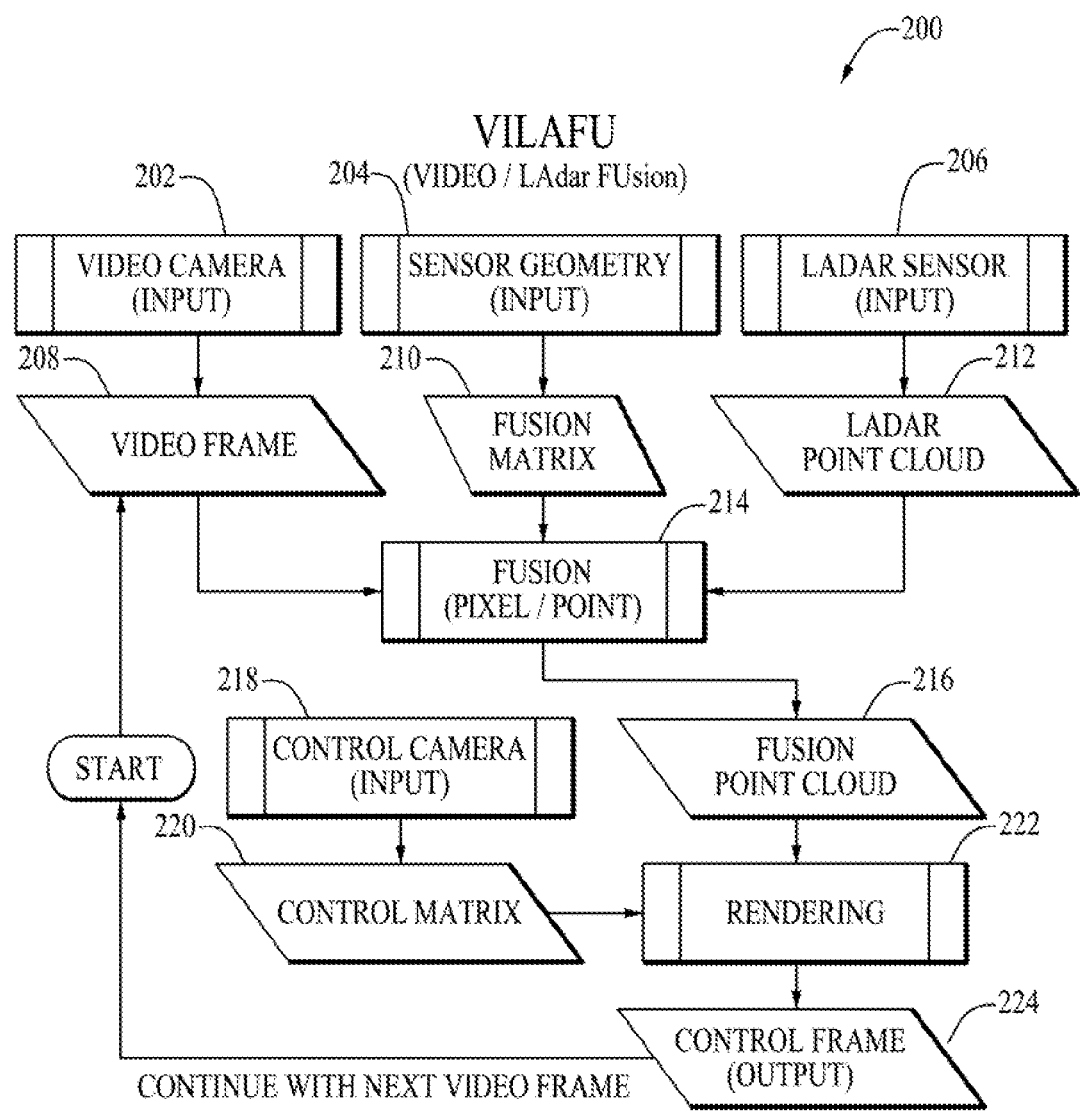
FIG. 2 is an exemplary block process diagram, according to some embodiments of the invention.

FIG. 2 illustrates an overall flow chart for some embodiments of the invention. FIG. 2 depicts the components that work together to produce a synthesized stream of video data that constitutes the fusion of an actual video data stream and an actual LADAR data stream for purposes of visualization, processing or other valuable purposes. High-level processes are depicted as rectangles having two interior vertical lines (see reference characters 202, 204, 206, 214, 218, and 222). Data structures are depicted as parallelograms (see reference characters 208, 210, 212, 216, 220, and 224).

Referring to FIG. 2, there are four inputs to the method of this technology: (1) the Video Camera collecting two-dimensional Video Frames composed of measurements of color intensity for each Pixel as reflected from the surface of a scene; (2) the LADAR Sensor collecting three-dimensional Cartesian coordinate Points composed from measurements of angle, angle and range to a given point on the surface of the scene; (3) the Sensor Geometry, the relative position and orientation of the Video Camera with respect to the LADAR Sensor that is used to compute the Fusion Matrix and is determined by either (a) instrumentation of the sensors, or (b) registration image processing techniques, or (c) the mounting of the sensors to the same optical bench in a known configuration, or (d) any combination of these methods or other methods, and the final input is (4) the Control Camera parameters. The Control Camera parameters allow the consumer of the output to control the view of the Fusion Point Cloud that is used in the rendering of the Control Frame output.

The Fusion process is the first, second and third steps in the method of Embodiments of the invention. The first step is to use the perspective projection transform called the Fusion Matrix to transform each Point of the LADAR Point Cloud from its Cartesian coordinates into the homogeneous Fusion Coordinate System (FCS). The FCS has projective geometry dimensions row, column and depth.

The second step is to fuse to each transformed Point, the Pixel color found in the Video Frame at the row and column indicated from the results of the transform of the first step. The third step will be to remove the non-visible Points found at deeper depth than the Point with the smallest depth for each row and column and the remaining Points will make up the Fusion Point Cloud as is done in typical computer graphics depth-buffer rendering. The Rendering process will be the fourth, fifth, and sixth steps in the method of this technology.

The fourth step is to use the Control Camera geometry with respect to the LADAR Sensor to compute a perspective projection transform called the Control Matrix. This Control Matrix is computed from the Control Camera parameters of image pixel width and height, angle field of view, and the position and orientation of the camera with respect to the LADAR sensor as is done in typical computer graphics perspective projection transforms.

The fifth step is to use the Control Matrix to transform each Point of the Fusion Point Cloud from its Cartesian coordinates into the homogeneous Control Coordinate System (CCS). The CCS has projective geometry dimensions row, column, and depth.

The sixth step is to remove the non-visible Points found at deeper depth than the Point with the smallest depth for each row and column, rendering the remaining Points into the colored pixels of a Control Frame image as is done in typical computer graphics depth-buffer rendering. These steps are repeated, continuing with the next Video Frame.

In FIG. 2, a method according to some embodiments is depicted. A method for electronically fusing a video data stream and actual LADAR data stream to produce a synthesized stream of video data includes providing a video camera collecting two-dimensional video frames composed of measurements of color intensity for each pixel as reflected or emitted from a surface of a scene (tasks 202 & 208). A LADAR sensor is provided to collect three-dimensional Cartesian coordinate points composed from measurements of angle and range to a particular point on the surface of the scene (task 206). The points compose a LADAR point cloud (task 212). Geometry (task 204) such as, for example, sensor geometry is provided for the relative position and orientation of the video camera with respect to the LADAR sensor. The geometry is used to compute fusion matrix (task 210).

The fusion matrix is used to electronically transform each point of the LADAR point cloud from Cartesian coordinates into a homogeneous fusion coordinate system (FCS). The FCS having projective geometry dimensions of row, column, and depth (task 214), which is called the fusion transform. A user control of the position and orientation of a control camera is provided (task 218), such that the position and orientation is used to compute a control matrix (task 220).

A fusion point cloud is generated by electronically fusing each fusion transformed point (task 216). The pixel energy intensity is found in the video frame at the row and column indicated from the fusion transform task (task 214) of each point of the LADAR point cloud. The control camera is used to control a view of the fusion point cloud by removing non-visible points found at depths deeper than a point having the smallest depth for each row and column. The visible points are rendered on the fusion point cloud to generate a control frame, which can also be called a synthetic video frame (tasks 222 & 224).

The rendering task (task 222), which can also be referred to as rendering a synthetic video frame, includes electronically computing a control matrix transform using the control camera geometry with respect to the LADAR sensor. The control matrix is computed from parameters of the control camera including image pixel width and height, angle field of view, and position and orientation of the control camera with respect to the LADAR sensor. Each point of the fusion point cloud is electronically transformed from Cartesian coordinates to homogeneous control coordinate system (CCS). The CCS has projective geometry dimensions of row, column, and depth.

Multiple synthetic video frames may be referred to as a synthesized stream of video data. The fusion transform includes electronically transforming each point of the fusion point cloud from Cartesian coordinates to homogeneous fusion coordinate system (FCS). The FCS has projective geometry dimensions of row, column, and depth. The non-visible points, found at depths deeper than a point having the smallest depth for each row and column, are removed from the fusion point cloud.

The control transform includes electronically transforming each point, of the control point cloud from Cartesian coordinates into homogenous control coordinate system (CCS). The CCS has projective geometry dimensions of row, column, and depth. The non-visible points, found at depths deeper than a point having the smallest depth for each row and column, are removed from the control point cloud.

FIGS. 3 through 6 depict exemplary block process diagrams associated with some embodiments of the invention. High-level processes are depicted as rectangles having two interior vertical lines (see, for example, reference characters 316 & 320 in FIG. 3). Data structure tasks/individual tasks are represented as regular rectangles (see, for example reference character 308 in FIG. 3). Determination tasks are represented as diamonds (see, for example, reference character 314 in FIG. 3).

Figure 3:
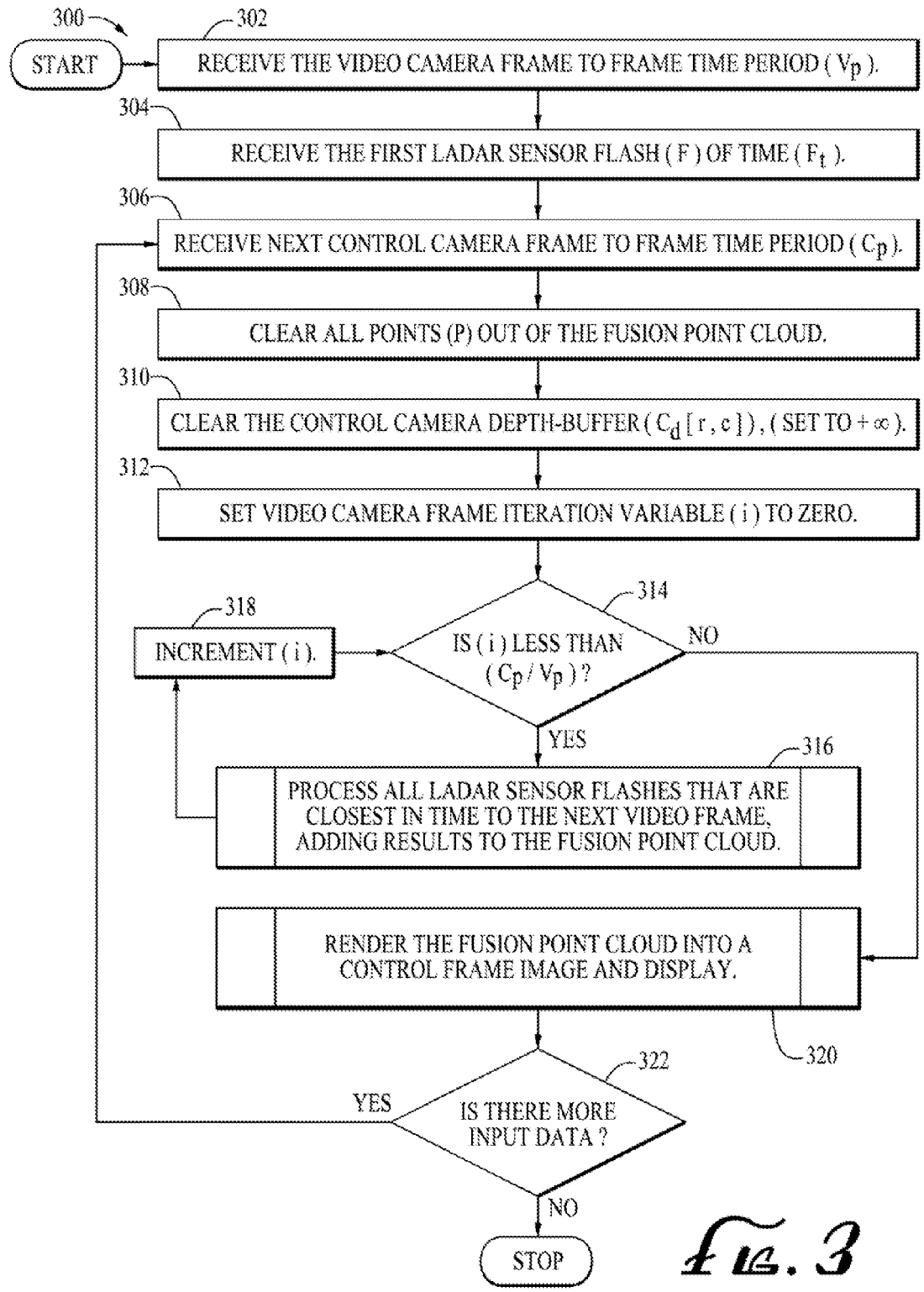
FIG. 3 is an exemplary block process diagram, according to some embodiments of the invention.

FIG. 3 depicts a block process diagram of fusing a video data stream and a LADAR data stream using a non-transitory computer readable medium, as depicted by reference character 300. The process includes providing a control processing unit (CPU) having electronic memory. A graphics processing unit (GPU) is provided and is electronically connected to the CPU. A LADAR sensor is provided. The LADAR sensor is associated with a navigation unit that is configured to communicate with the CPU. A video camera is provided and is configured to collect two-dimensional video frames composed of color intensity for each pixel as reflected from a surface of a scene. The video camera is configured to communicate with the GPU. A control camera is provided and is in electrical communication with the GPU. The control camera is controlled by user input and has a depth buffer, ($C_d[r,c]$). The depth buffer, ($C_d[r,c]$), is a two-dimensional array holding a depth for each element of the array. The LADAR sensor has a fusion point cloud of points (P).

A video camera frame to frame time period ($V_p$) is received from the video camera with the GPU (task 302). A first LADAR sensor flash (F) as a function of time ($F_t$) is received with the GPU (task 304). In task 306, a next control camera frame to frame time period ($C_p$) is received with the GPU. $C_p$ is the time period from one frame of the control camera to the next frame. All points (P) are cleared out of the fusion point cloud (task 308). Task 310 clears the control camera depth buffer, ($C_d[r,c]$), is sets it to +∞. The video camera frame iteration variable (i) is set to zero (task 312). Task 314 is an iterative determination task. In task 314, it is determined whether (i)<($C_p/V_p$). When it is determined that (i)<($C_p/V_p$), all of the first LADAR sensor flashes are processed that are closest in time to the next video frame. The results are added to the fusion point cloud (task 316). Task 318 then increments to the next video camera frame iteration variable (i), designated as (i+1). Task 314 is then iterated through until it is determined that (i)≥($C_p/V_p$). When it is determined that (i)≥($C_p/V_p$), the fuion point cloud is rendered into a control frame image and display (Task 320). The process can be iterated through when additional input data exits. Task 322 illustrates iterating through tasks 306 through 320 until no additional input data exists or stated another way, the iteration occurs until all input data has been processed.

Figure 4:
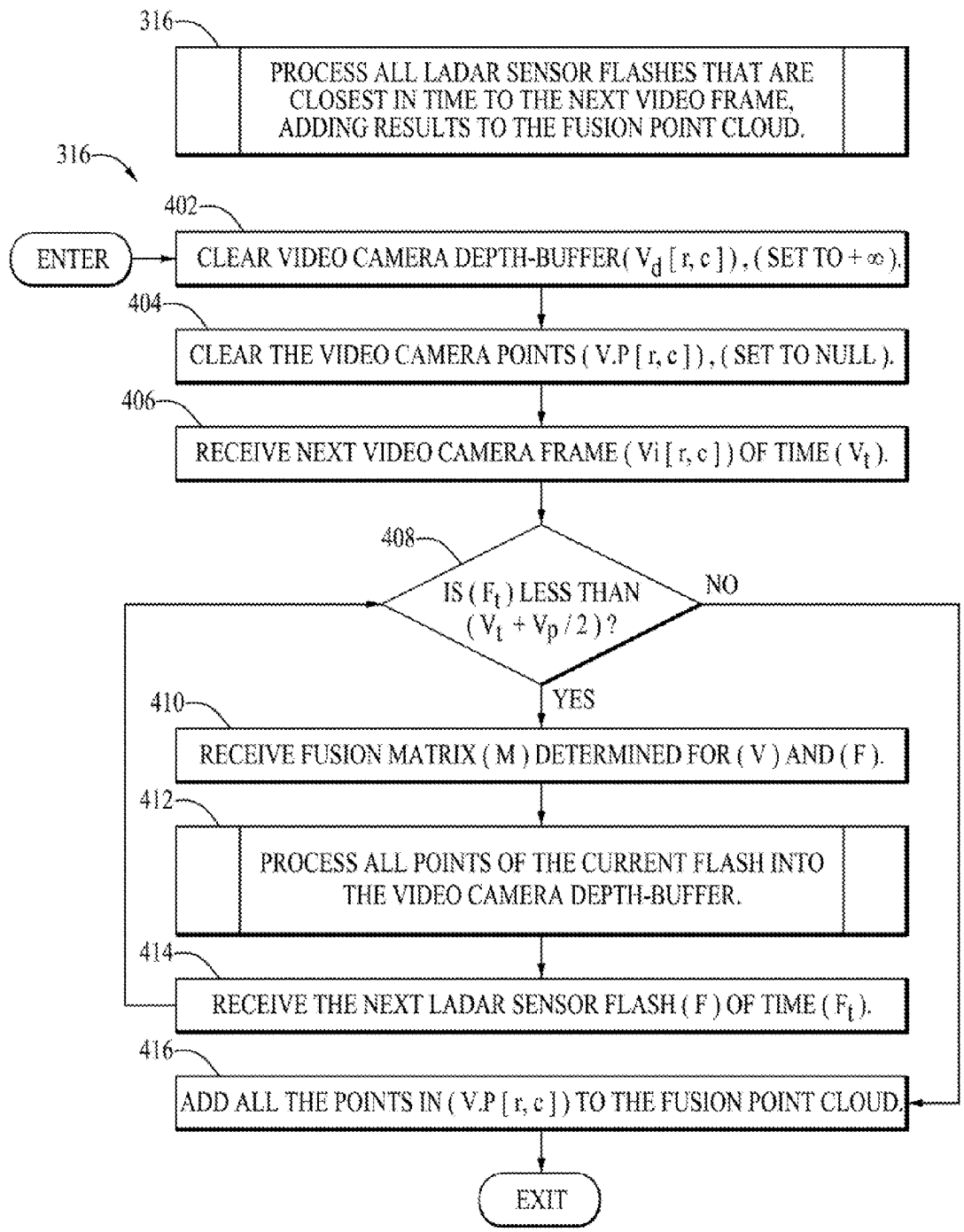
FIG. 4 is an exemplary block process diagram, according some embodiments of the invention.

FIG. 4 provides a more detailed view of task 316 in FIG. 3. The processing of the LADAR sensor flashes task (task 316 in FIG. 4), includes clearing the video camera depth buffer, ($V_d[r,c]$), and setting it to Infiniti+∞ (task 402). The video camera points, (V.P [r,c]), are then cleared and set to null (task 404). Null is a zero value character. It may also be referred to as the process of discarding previous data. The next video camera frame, $V_p$, is received as well as the intensity, ($V_i[r,c]$), corresponding to time ($V_t$) (task 406). Task 408 is as determination of whether $$F(t) < \left(V_t + \frac{V_p}{2}\right).$$

When it is determined that $$F(t) < \left(V_t + \frac{V_p}{2}\right),$$

task 410 is performed. Fusion matrix (M) is received as determined for the data type (V) and the LADAR sensor flash (F). All points of the current flash are processed into the video camera depth buffer, $V_d[r,c]$ (task 412). The next LADAR sensor flash (F) of time ($F_t$) is then received (task 414). Tasks 408 through 414 are iterated through until $$F(t) \geq \left(V_t + \frac{V_p}{2}\right).$$

When it is determined that $$F(t) \geq \left(V_t + \frac{V_p}{2}\right),$$

the video camera points, V.P [r,c], are added to the fusion point cloud (task 416).

Figure 5:
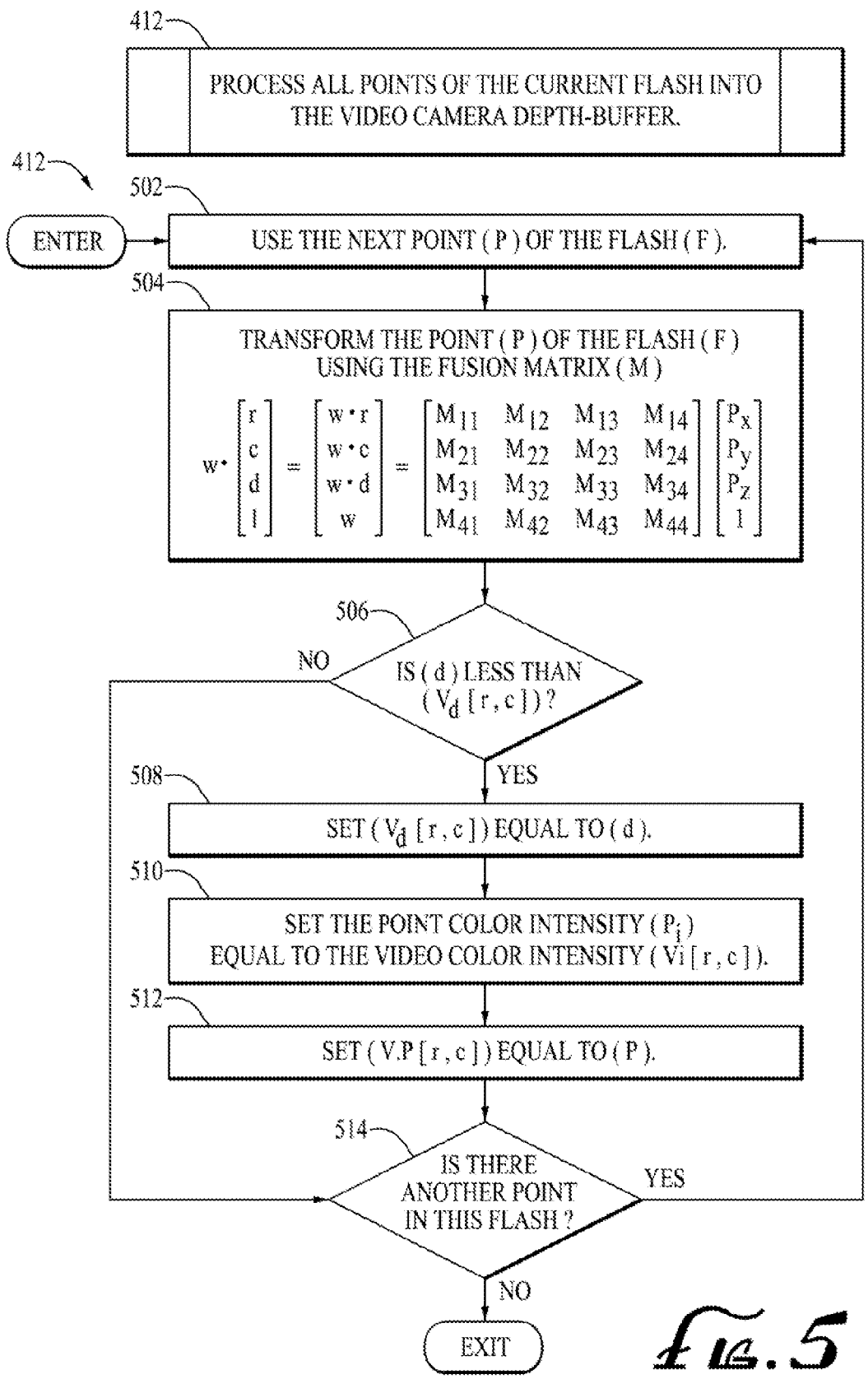
FIG. 5 is an exemplary block process diagram, according to some embodiments of the invention.

FIG. 5 illustrates task 412 (from FIG. 4) in greater detail, and is referenced as reference character 412. The processing of all points of the current flash into the video camera depth-buffer includes transforming the point (P) of the flash (F) using the fusion matrix (M) (tasks 502 & 504). Task 506 determines whether determining whether d<$V_d[r,c]$, where d is a depth, which is the distance between the point (P) and the video camera.

When d<$V_d[r,c]$, task 508 sets $V_d[r,c]$=d. The point color intensity, ($P_i$), is then set equal to the video color intensity, $V_i[r,c]$ (task 510). Next, task 512 sets (V.P [r,c] equal to (P). When another point (P) exists (task 514), tasks 502 through 512 are iterated through until there are no additional points (P) of flash (F).

Figure 6:
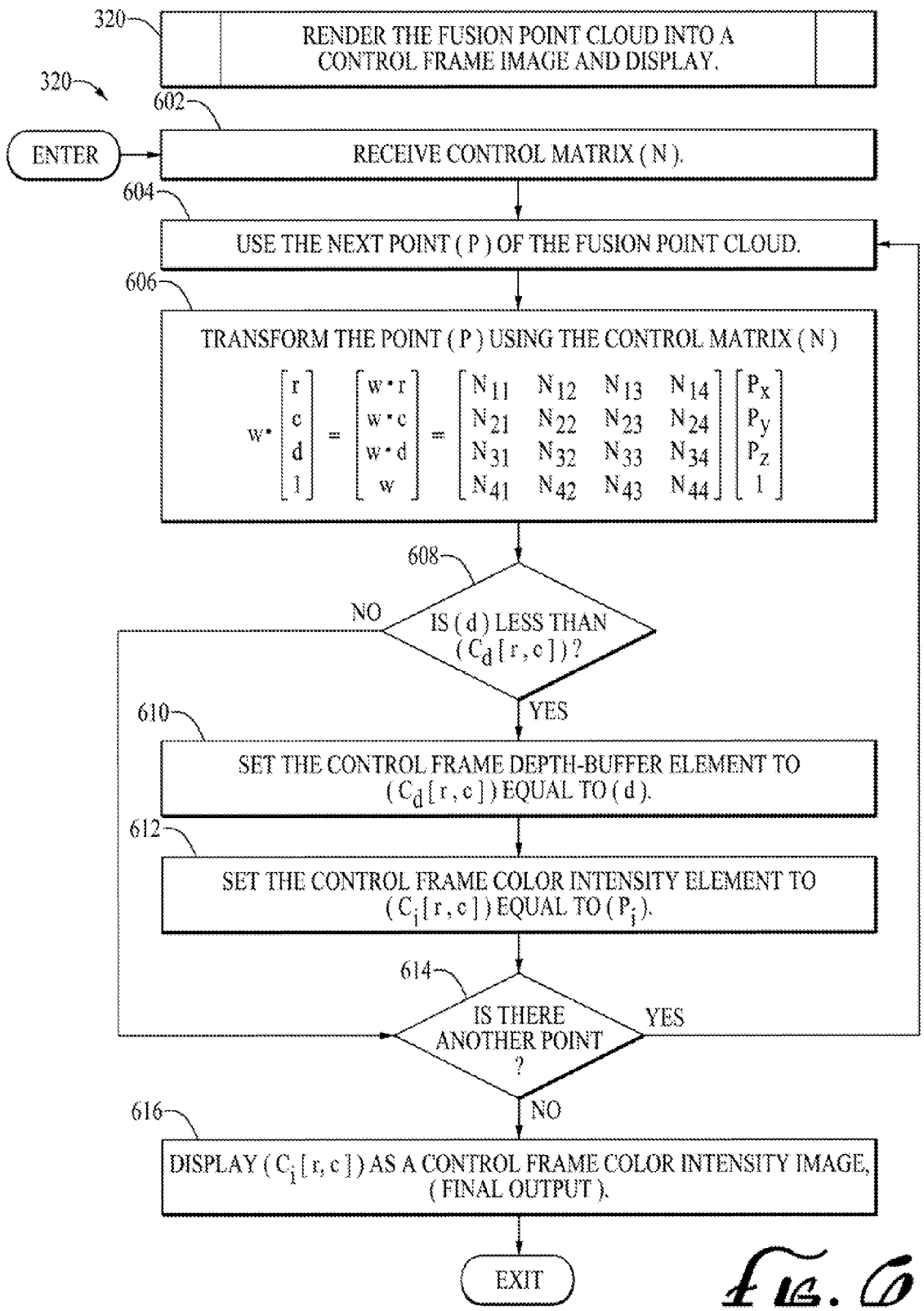
FIG. 6 is an exemplary block process diagram, according to some embodiments of the invention.

FIG. 6 illustrates the rendering task (task 320) from FIG. 3 in greater detail. The rendering of the fusion point cloud into a control frame image and display task includes receiving the control matrix (N) (task 602). In tasks 604 & 606, the point (P) of the fusion point cloud is used to transform point (P) using control matrix (N).

Task 608 determines whether d<$C_d[r,c]$. When d<$C_d[r,c]$, task 610 sets the control frame depth-buffer element, $C_d[r,c]$ equal to d ($C_d[r,c]$=d). In task 612, instruction is given to set the control camera intensity value, $C_i[r,c]$, equal to the video camera color intensity, $P_i$ ($C_i[r,c]$=$P_i$).

When it is determined that d>$C_d[r,c]$, the "no" branch is followed and task 614 is performed. Likewise, task 614 is also performed after task 612 described above. A determination (task 614) is made whether another point is available. Tasks 604 through 614 are iterated through until another point is not available. When another point is not available (task 616), $C_i[r,c]$ is displayed as a control frame color intensity image in a tangible medium. The tangible medium is a visual display screen. It should be noted, also, that the control frame color intensity image can also be transmitted to systems making use of the output.

Thus, other tangible outputs are possible without detracting from the merits or generality of embodiments of the invention. As such, embodiments, the tangible outputs may be shown and/or represented as a visual display screen depiction, hard copy printouts, as well as other media using classification/matching information such as, for example, a computer having computer-readable instructions that is configured to use output from embodiments of the invention. The output may be used in programs using the output such as, for example, in automatic target recognition (ATR) algorithms.

In embodiments, the video camera and the LADAR sensor are actual physical sensors. The control camera is a virtual control camera controlled by user input such as, for example, with a keyboard and mouse combination.

While this technology is primarily described using LADAR, other energy sensor systems such as RADAR, SONAR, and LIDAR can also be simulated using this technology. OpenGL is a software interface to computer graphics hardware and can be used for fusing and visualization.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and tower limits of these smaller ranges may independently be included or excluded in the range, and each range where either, neither or both limits are included in the smaller ranges is also encompassed within the invention, subject any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for visual verification of target recognition by electronically fusing a two-dimensional video data stream and a three-dimensional LADAR data stream to produce a synthesized stream of target video data, comprising:
    providing a system to recognize a target, said system, comprising:
        a control processing unit (CPU) having electronic memory;
        a graphics processing unit (GPU) electronically connected to said CPU;
        a LADAR sensor associated with an airborne vehicle navigation unit;
        a video camera in communication with said GPU, said video camera having position and orientation geometry relative to said LADAR sensor; and
        a control camera in communication with said GPU;
    collecting two-dimensional video frames with said video camera, said video frames composed of measurements of energy intensity for each pixel as reflected or emitted from a surface of a scene of the target;
    collecting three-dimensional Cartesian coordinate points with said LADAR sensor, said three-dimensional Cartesian coordinate points composed from measurements of angle and range to a particular point on said surface of said scene, said points composing a LADAR point cloud of the target;
    computing a fusion matrix using said video camera geometry and electronically transforming each point of said LADAR point cloud from Cartesian coordinates into a homogeneous fusion coordinate system (FCS), said FCS having projective geometry dimensions of row, column, and depth, wherein said transform is a fusion transform;
    providing user control of the position and orientation of said control camera and, using said position and orientation of said control camera, computing a control matrix;
    generating a fusion point cloud by electronically fusing each fusion transformed point, and the pixel energy intensity found in said video frame at the row and column indicated from said fusion transform task of each of said points of said LADAR point cloud;
    generating a control point cloud by using said control matrix to electronically transform each point of said fusion point cloud from Cartesian coordinates into a homogeneous control coordinate system (CCS), said CCS having projective geometry dimensions of row, column, and depth, wherein said transform is a control transform;
    rendering a synthetic target video frame by using the pixel energy intensity found in each point of said control point cloud at the row and column indicated from said control transform task of each of said points of said fusion point cloud, wherein a plurality of said synthetic target video frames are a synthesized stream of target video data; and
    displaying said synthesized stream of target video data on a visual display screen for visual verification by a user.

2. The method according to claim 1, said fusion transform, further comprising:
    electronically computing said fusion matrix using said video geometry of said video camera, wherein said fusion matrix is computed from parameters of said video camera including image pixel width and height, angle field of view, and position and orientation of said video camera;
    electronically transforming each point of said fusion point cloud from Cartesian coordinates to homogeneous fusion coordinate system (FCS), wherein said FCS having projective geometry dimensions of row, column, and depth; and
    removing, from said fusion point cloud, the non-visible points found at depths deeper than a point having the smallest depth for each of said row and said column.

3. The method according to claim 1, said control transform, further comprising:
    electronically computing said control matrix using said user control of the position and orientation of said control camera, wherein said control matrix is computed from parameters of said control camera including image pixel width and height, angle field of view, and position and orientation of said control camera;
    electronically transforming each point of said control point cloud from Cartesian coordinates to homogeneous control coordinate system (CCS), wherein said CCS having projective geometry dimensions of row, column, and depth; and
    removing, from said control point cloud, the non-visible points found at depths deeper than a point having the smallest depth for each of said row and said column.

4. The method according to claim 1, wherein said video camera and said LADAR sensor are actual physical sensors and said control camera is a virtual control camera controlled by user input.

5. The method according to claim 1, wherein said video camera and said LADAR sensor are physical sensors and said control camera is a digital camera controlled by user input.

* * * * *